April 26, 1932.   W. W. ALLEN   1,855,660
FAN
Filed Feb. 6, 1931
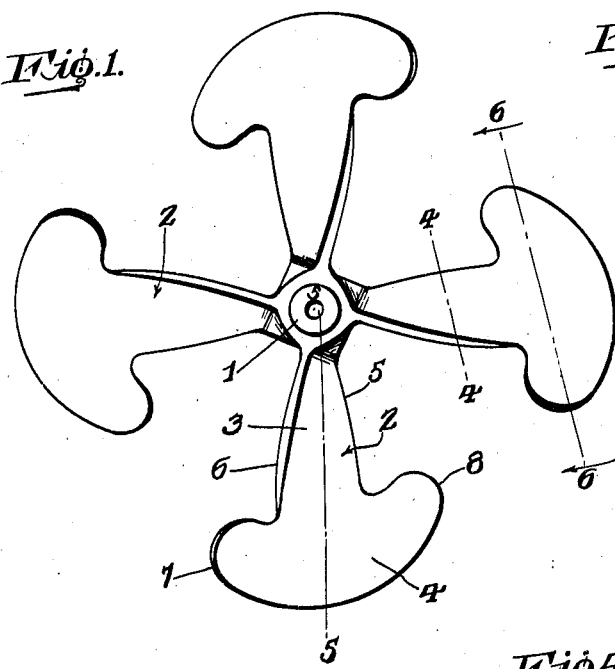
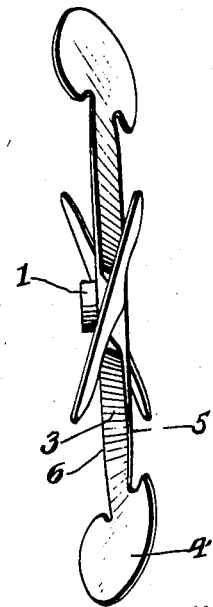
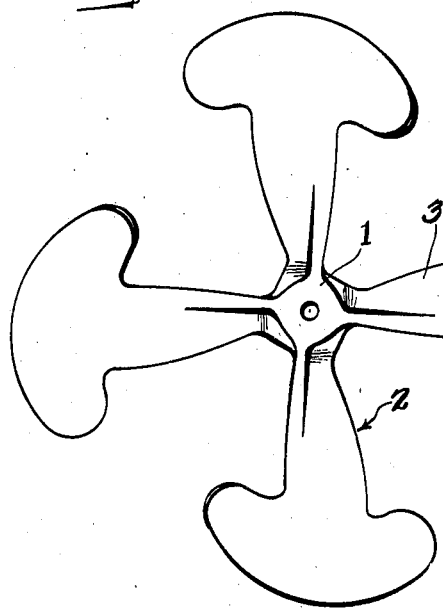
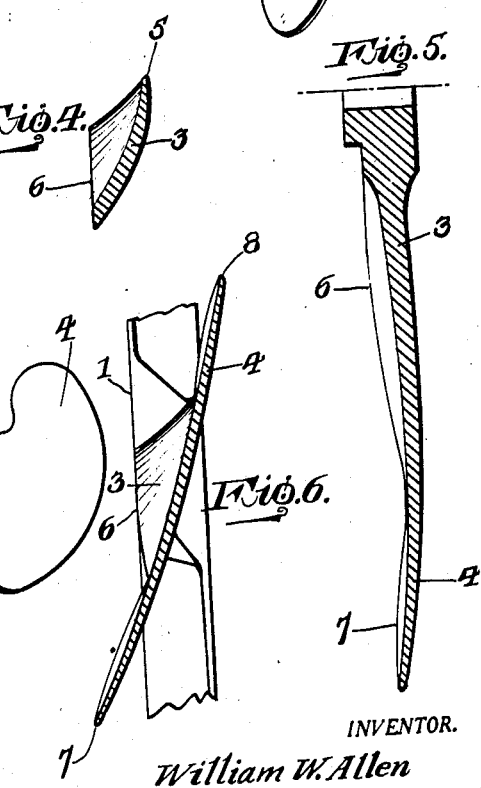
INVENTOR.
William W. Allen
BY
Geo. P. Kimmel
ATTORNEY.

Patented Apr. 26, 1932

1,855,660

UNITED STATES PATENT OFFICE

WILLIAM W. ALLEN, OF JACKSONVILLE, FLORIDA

FAN

Application filed February 6, 1931. Serial No. 513,991.

This invention relates to a fan and has for its primary object to provide, in a manner as hereinafter set forth, a fan having a plurality of blades of such configuration that air deflected therefrom during the rotation thereof will be of extremely large volume and high velocity, thereby assuring maximum efficiency in the operation of the fan.

With the foregoing and other objects in view, the invention consists of the novel construction, combination and arrangement of parts as hereinafter more specifically described, and shown in the accompanying drawings, but it is to be understood that the description and drawings are to be considered as illustrative rather than limitative.

In the accompanying drawings in which like numerals are employed to designate like parts throughout the several views:

Figure 1 is a front elevation of a fan in accordance with this invention.

Figure 2 is a side elevation thereof.

Figure 3 is a rear elevation thereof.

Figure 4 is an enlarged section through one of the blades of the fan taken at a point indicated by the lines 4—4 of Figure 1.

Figure 5 is an enlarged section taken on the line 5—5 of Figure 1.

Figure 6 is an enlarged section taken on the line 6—6 of Figure 1.

Referring to the drawings in detail, the numeral 1 indicates a hub which is adapted for connection with the shaft of a motor, not shown. Projecting radially from the hub 1 is a plurality of blades indicated generally at 2 and each including a tapered shank 3 and a substantially oval shaped tip 4. The shank 3 gradually increases in width from its inner to its outer end. The transverse line of each shank 3, at its point of mergence with the hub 1 is disposed obliquely to the axis of the hub with the leading edge 5 of the shank disposed a material distance rearwardly of the follower edge 6 thereof. The forward face of the shank is concaved transversely thereof, and the shank gradually increases in thickness from the leading edge 5 to the follower edge 6. The shank is further formed with a torsional twist whereby the leading edge 5 is disposed rearwardly of the follower edge 6 a shorter distance at the point of mergence with the tip 4 than at the point of mergence with the hub 1, and whereby the transverse line of the shank at its point of mergence with the tip 4 is disposed at a greater angle to the axis of the hub than the transverse line of the shank at its point of mergence with the hub.

The tip 4 is of greater length than width and is disposed transversely of the shank at the outer end of the latter. Owing to the greater length of the follower edge 6 than the leading edge 5, the tip is disposed at an inward inclination from the follower edge 7 thereof to the leading edge 8 thereof. The forward face of the tip 4 is concaved lengthwise thereof, and the forward face of the blade is concaved longitudinally of the shank and transversely of the tip.

By constructing the fan blades in accordance with this invention, more static pressure is developed with less horse power than with any conventional type blade on the market. Quietness is also obtained, due to the construction of this particular type blade in that the air entering the fan from the rear is picked up in the center where the blade is very narrow and thrown off at the point of large surface which is flattened out to prevent the sharp, churning sound that is usually caused in ordinary type of air propeller blades. The quietness also is increased due to the fact that the elongated tips of the blades travel in a longitudinal direction.

It is thought that the many advantages of a fan in accordance with this invention will be readily apparent, and although the preferred embodiment of the invention is as illustrated and described, it is to be understood that changes in the details of construction may be resorted to, so long as such changes fall within the scope of the invention as defined in the appended claims.

What I claim is:

1. A fan comprising, a hub, and a series of radially disposed blades, each consisting of a shank and a tip, said shank disposed obliquely to the axis of the hub, gradually increasing in width from its inner to its outer edge, gradually increasing in thickness from its leading to its follower edge and formed integral at its outer end concentrically of the inner edge of the tip, said tip being of substantially oval contour and disposed oblique to the axis of the hub, said tip and shank having their forward faces throughout concaved and their rear faces convex from their leading to their follower edges, said shank being torsionally twisted to provide for its transverse line at its point of mergence with the inner edge of the tip disposed at a greater angle to the axis of the hub than the transverse line at its point of mergence with the hub, and each blade having its forward face concaved longitudinally of its shank and transversely of its tip.

2. A fan comprising, a hub, and a plurality of radially disposed blades, each including a shank and a tip, said shank having its forward face concaved longitudinally throughout and said tip having its forward face concaved transversely throughout, said shank being torsionally twisted, gradually increasing in thickness from its leading to its follower edge and having its outer end merging into the inner edge of said tip at the transverse median of the latter.

3. A fan comprising, a hub, and a plurality of radially disposed blades, each including a shank and a tip, said shank having its forward face concaved longitudinally throughout and said tip having its forward face concaved transversely throughout, said shank being torsionally twisted, gradually increasing in thickness from its leading to its follower edge and having its outer end merging into the inner edge of said tip at the transverse median of the latter, and said tip being substantially of oval contour and having its rear edge curving outwardly from each end towards the outer end of the shank.

In testimony whereof, I affix my signature hereto.

WILLIAM W. ALLEN.